(12) United States Patent
Nakamizo et al.

(10) Patent No.: US 7,122,396 B2
(45) Date of Patent: Oct. 17, 2006

(54) SEMICONDUCTOR ACCELERATION SENSOR AND PROCESS FOR MANUFACTURING THE SAME

(75) Inventors: Yoshiyuki Nakamizo, Toyama (JP); Tsutomu Sawai, Toyama (JP); Masato Ando, Toyama (JP)

(73) Assignee: Hokuriku Electric Industry Co., Ltd., Kami-Niikawagu (JP)

( * ) Notice: Subject to any disclaimer, the term of this patent is extended or adjusted under 35 U.S.C. 154(b) by 13 days.

(21) Appl. No.: 10/530,341

(22) PCT Filed: Oct. 3, 2003

(86) PCT No.: PCT/JP03/12733

§ 371 (c)(1),
(2), (4) Date: Apr. 1, 2005

(87) PCT Pub. No.: WO2004/031781

PCT Pub. Date: Apr. 15, 2004

(65) Prior Publication Data
US 2006/0094148 A1 May 4, 2006

(30) Foreign Application Priority Data
Oct. 4, 2002 (JP) ............................. 2002-292782

(51) Int. Cl.
*H01L 21/00* (2006.01)
*H01L 21/20* (2006.01)

(52) U.S. Cl. ............................. 438/48; 438/51; 438/53; 438/50; 438/56; 438/57; 438/385; 257/440; 257/444; 257/417; 257/418; 257/419; 257/420; 257/421; 257/E21.505; 73/514.33; 73/514.11

(58) Field of Classification Search ................. 438/48, 438/51, 53, 385; 257/440, 444, 417–422; 73/514.33, 514.11
See application file for complete search history.

(56) References Cited

U.S. PATENT DOCUMENTS 6,551,853 B1 * 4/2003 Toyoda ........................ 438/90
6,632,697 B1 * 10/2003 Ueyanagi et al. ............. 438/48

* cited by examiner

*Primary Examiner*—Michael Lebentritt
*Assistant Examiner*—Mohsen Ahmadi
(74) *Attorney, Agent, or Firm*—Rankin, Hill, Porter & Clark LLP

(57) ABSTRACT

The present invention provides a semiconductor acceleration sensor wherein a semiconductor element is prevented from being damaged even when at least part of a weight is disposed in an internal space of a semiconductor sensor element and the mass of a weight is accordingly increased. An inner peripheral surface of a support portion 9 is constituted by four trapezoidal inclined surfaces 13 of a substantially identical shape which are annularly combined so as to define an outer peripheral surface of a frust-pyramidal space. A weight 3 is so constructed as to have an abutting portion including a linear portion 3d which abuts against the inclined surfaces 13 constituting the inner peripheral surface of the support portion 9 when the weight 3 makes a maximum displacement in a direction where a diaphragm portion 11 is located. The abutting portion 3d has a circular outline shape as seen from a side where a weight fixing portion 7 is located. A stopper structure is constituted by the inclined surfaces 13 and the abutting portion 3d of the weight 3, for restricting a displacement range of the weight 3 in the direction where the diaphragm portion 11 is located.

12 Claims, 5 Drawing Sheets

Fig.5
(A)
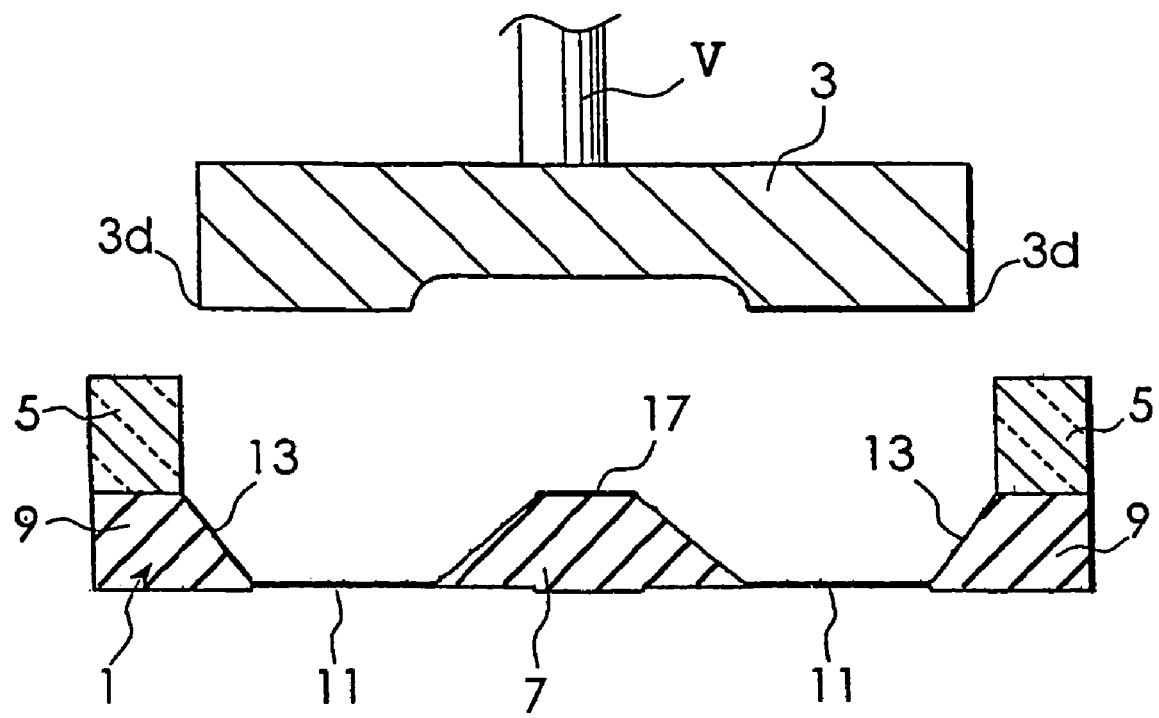
(B)
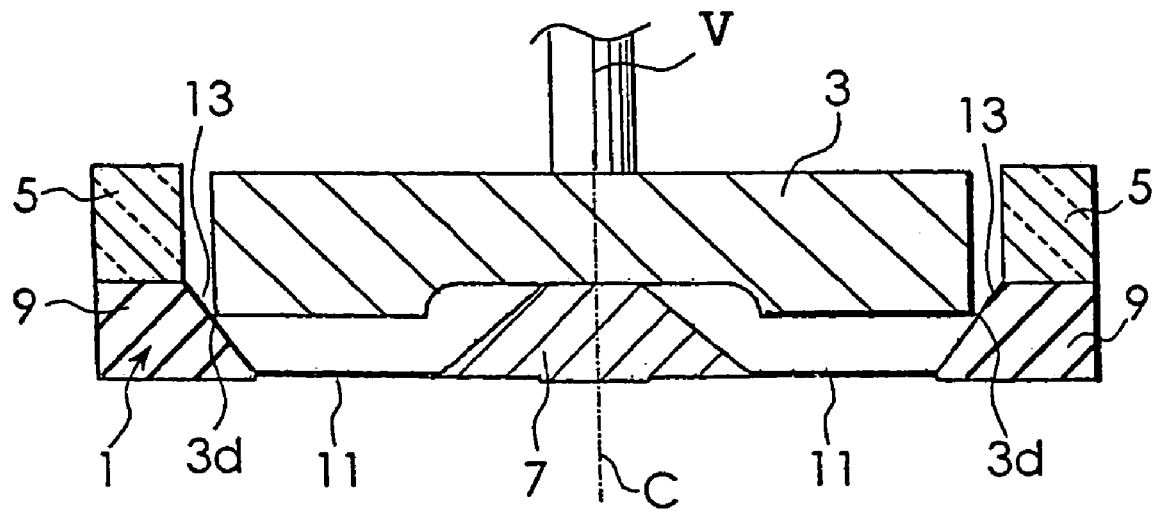

SEMICONDUCTOR ACCELERATION SENSOR AND PROCESS FOR MANUFACTURING THE SAME

FIELD OF THE INVENTION

The present invention relates to a semiconductor acceleration sensor and a manufacturing method thereof.

BACKGROUND ART

The Official Gazette of Japanese Patent No. 3290047 discloses in FIG. 1 on page 6 a semiconductor acceleration sensor wherein part of a weight is disposed in an internal space of an acceleration sensor body. In this semiconductor acceleration sensor, an inner peripheral surface of a support surrounding the internal space and an outer peripheral surface of the weight are respectively formed as an inclined surface so as to be parallel with each other, which consequently increases the mass of the weight.

In such a semiconductor acceleration sensor of the above-mentioned construction, however, such consideration is not given that a diaphragm portion of a semiconductor sensor element is prevented from being damaged by restraining the movement of the weight when acceleration toward the semiconductor sensor element is added to the mass-increased weight (in a vertical axis direction). Consequently, if large acceleration is added to the mass-increased weight, the semiconductor sensor element is damaged. In addition, such a conventional semiconductor acceleration sensor requires a complicated manufacturing process for making the inner peripheral surface of the semiconductor sensor element and the outer peripheral surface of the weight accurately parallel to each other, and for aligning a center of the weight with that of the semiconductor sensor element.

Accordingly, an object of the present invention is to provide a semiconductor acceleration sensor wherein a semiconductor sensor element is not damaged even when disposing at least part of a weight in an internal space of the semiconductor sensor element and increasing the mass of a weight.

Another object of the present invention is to provide a semiconductor acceleration sensor which does not require a complicated manufacturing process for aligning the weight relative to a support of the acceleration sensor body.

Still another object of the present invention is to provide a semiconductor acceleration sensor which is capable of reducing discrepancy of the central position between the weight and the support portion when the weight is displaced in a direction where a diaphragm portion is located and lessening variations in performance in spite of dimensional errors in manufacturing the support portion and weight.

Yet another object of the present invention is to provide a semiconductor acceleration sensor which is capable of readily and accurately aligning the center of the weight with that of the acceleration sensor body, and a manufacturing method thereof.

DISCLOSURE OF THE INVENTION

A semiconductor acceleration sensor according to the present invention comprises a semiconductor sensor body including a weight fixing portion located at a central area thereof, a cylindrical support portion located at an outer peripheral area thereof, and a diaphragm portion having flexibility and located between the weight fixing portion and the support portion; an acceleration sensor element composed of diffused resistors formed in the diaphragm portion; and a weight fixed on the weight fixing portion in such a manner that a center of the weight is aligned with a center-line passing through a center of the weight fixing portion and extending in a direction orthogonal to an extending direction of the diaphragm portion. An inner peripheral surface of the support portion is constituted by four trapezoidal inclined surfaces of a substantially identical shape that are annularly combined so as to define an outer peripheral surface of a frust-pyramidal internal space of the support portion. The weight has an abutting portion including a liner portion which abuts against the inner peripheral surface when the weight makes a maximum displacement in a direction where the diaphragm portion is located. The abutting portion has a circular outline shape as seen from a side where the weight fixing portion is located. A stopper structure is constituted by the inner peripheral surface of the support portion and the abutting portion, for restricting a displacement range of the weight in a direction where the diaphragm portion is located. As with the prevent invention, by constituting the stopper structure from the inner peripheral surface of the support portion and the abutting portion of the weight, the linear portion of the abutting portion formed in an almost circular shape on the weight is supposed to abut against the four trapezoidal inclined surfaces of the support portion when the weight makes a large displacement in a direction where the diaphragm portion is located. Thus, when vertical acceleration is applied to the acceleration sensor, the abutting portion of the weight abuts against the inner peripheral surface of the support portion, thereby preventing a displacement large enough to damage the diaphragm portion from being applied to the diaphragm portion. Especially in the present invention, since the abutting portion has a linear outline, stopper functionality is almost always attained whatever portion of the inner peripheral surface of the support portion the abutting portion abuts against. Therefore, even in case of mass production of the sensors, variations in performance are suppressed.

With this arrangement, merely by moving the weight closer to the semiconductor sensor body until the abutting portion of the weight comes in contact with the four inclined surfaces, the weight is displaced along the four inclined surfaces, whereby the center of the weight is aligned with a centerline passing through the center of the weight fixing portion. Thus, self-alignment effect is attained. Therefore, according to the present invention, there is no need of using a special device to align the weight relative to the support portion of the acceleration sensor body.

Theoretically, it is optional to define where the abutting portion and inclined surfaces should come in contact. However, if a contact position of the abutting portion and the inclined surfaces is located on a side of a bottom surface of the support portion relative to a central position of the support portion in a thickness direction thereof, it is possible to reduce a shock which is conveyed from the contacting portion to an interface between the diaphragm portion and the support portion.

The semiconductor sensor body may be formed by etching a semiconductor crystal substrate.

In order to increase the mass of the weight, a metallic weight is preferred. In this case, it is possible to manufacture a semiconductor acceleration sensor at low cost that is thin in thickness and has high sensitivity by employing low-priced tungsten with high specific gravity to form the weight.

In the present invention, a pedestal for supporting the acceleration sensor body is optionally provided. In this case, by shaping the weight so as to be disposed in both an internal space of the support portion and an internal space of the pedestal, a volume of the weight can be expanded although the total thickness of the sensor is increased. Thus, the mass of the weight can be increased, thereby improving sensitivity.

Any construction can be chosen to form the linear portion of the abutting portion. For example, the part of the weight, which is disposed in the internal space of the support portion, has a first surface extending in a direction along the diaphragm portion and a second surface extending in a direction orthogonal to the inner peripheral surface of the support portion in such a manner that the first and second surfaces intersect with each other. An intersection of these two surfaces may define the abutting portion. With this arrangement, the linear portion of the abutting portion can be simplified in shape.

BRIEF DESCRIPTION OF THE DRAWINGS

FIGS. 5(A) and 5(B) illustrate how to fix a weight onto the acceleration sensor body in the semiconductor acceleration sensor of FIG. 1.

BEST MODE FOR IMPLEMENTING THE INVENTION

Figure 1:
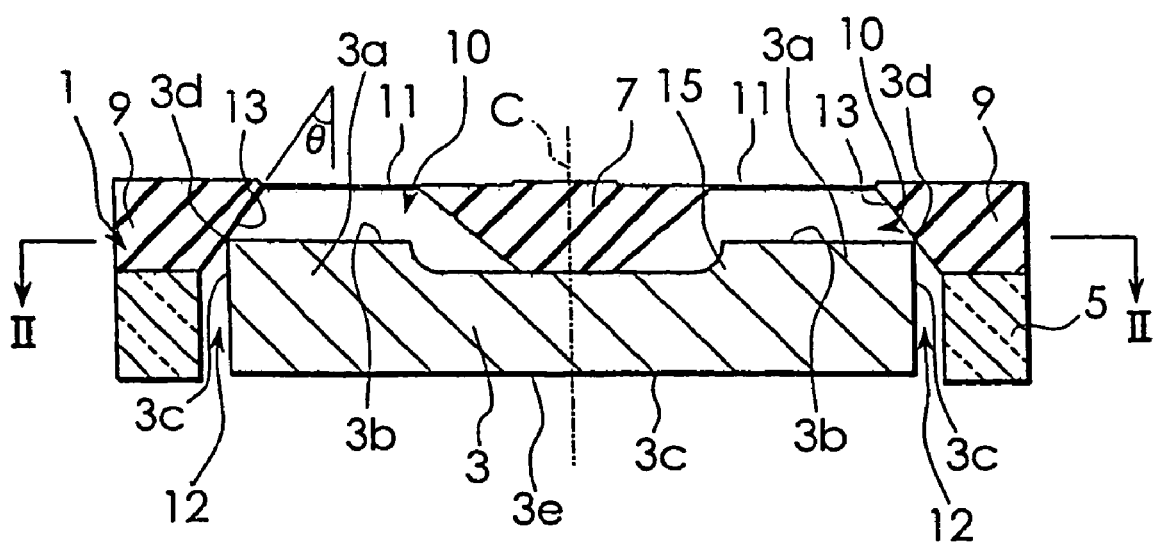
FIG. 1 is a cross-sectional view of a semiconductor acceleration sensor according to an embodiment of the present invention.
Figure 2:
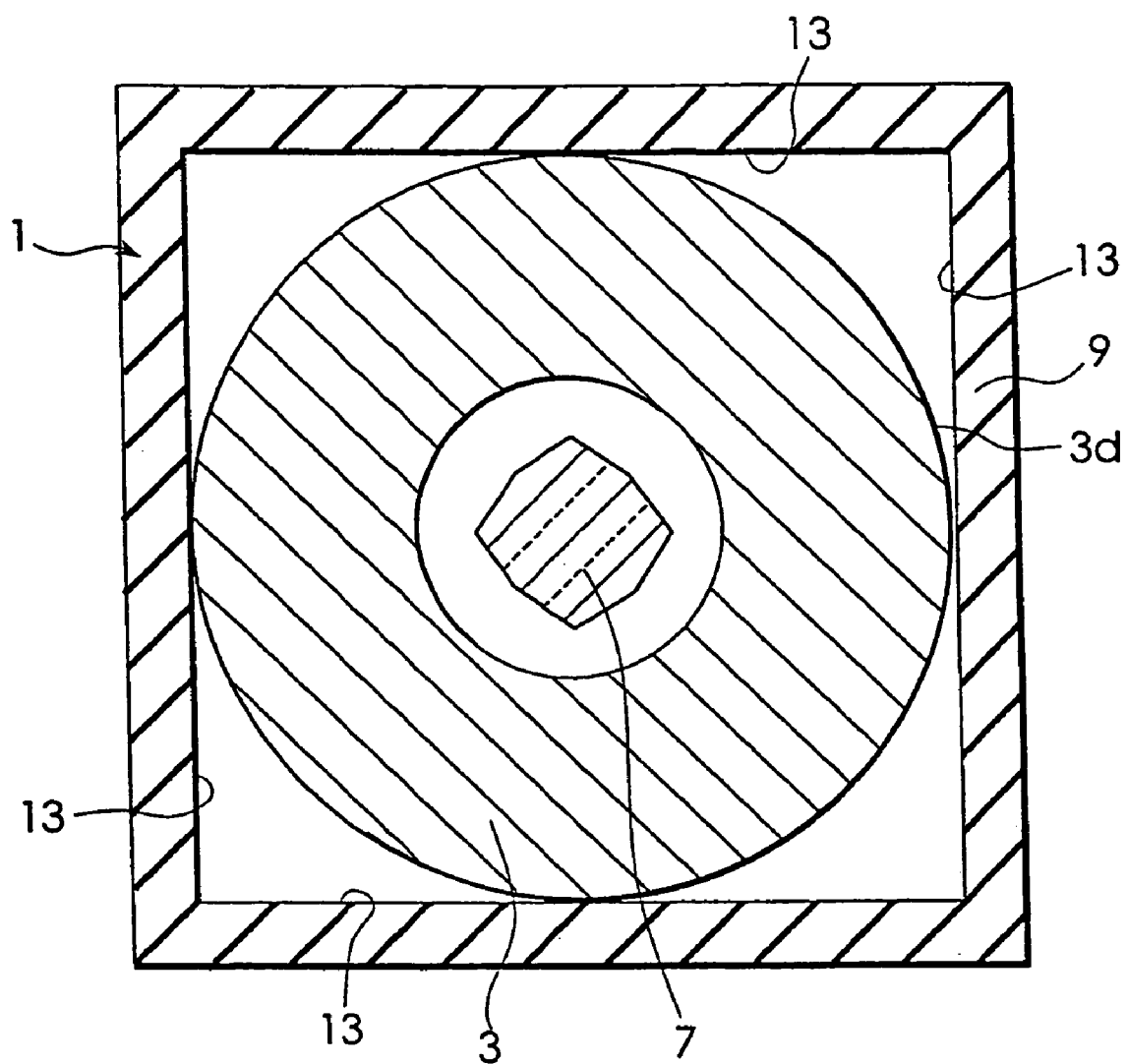
FIG. 2 is a cross-sectional view, as taken along the II—II line, of FIG. 1.

Now, an embodiment of the present invention will be described in detail with reference to the accompanying drawings. FIG. 1 is a cross-sectional view of a semiconductor acceleration sensor according to an embodiment of the present invention. FIG. 2 is a cross-sectional view, as taken along the II—II line, of FIG. 1. As shown in these figures, a semiconductor acceleration sensor according to the present invention comprises an acceleration sensor body 1, a weight 3 fixed on the acceleration sensor body 1, and a glass pedestal 5 supporting the acceleration sensor body 1.

Figure 3:
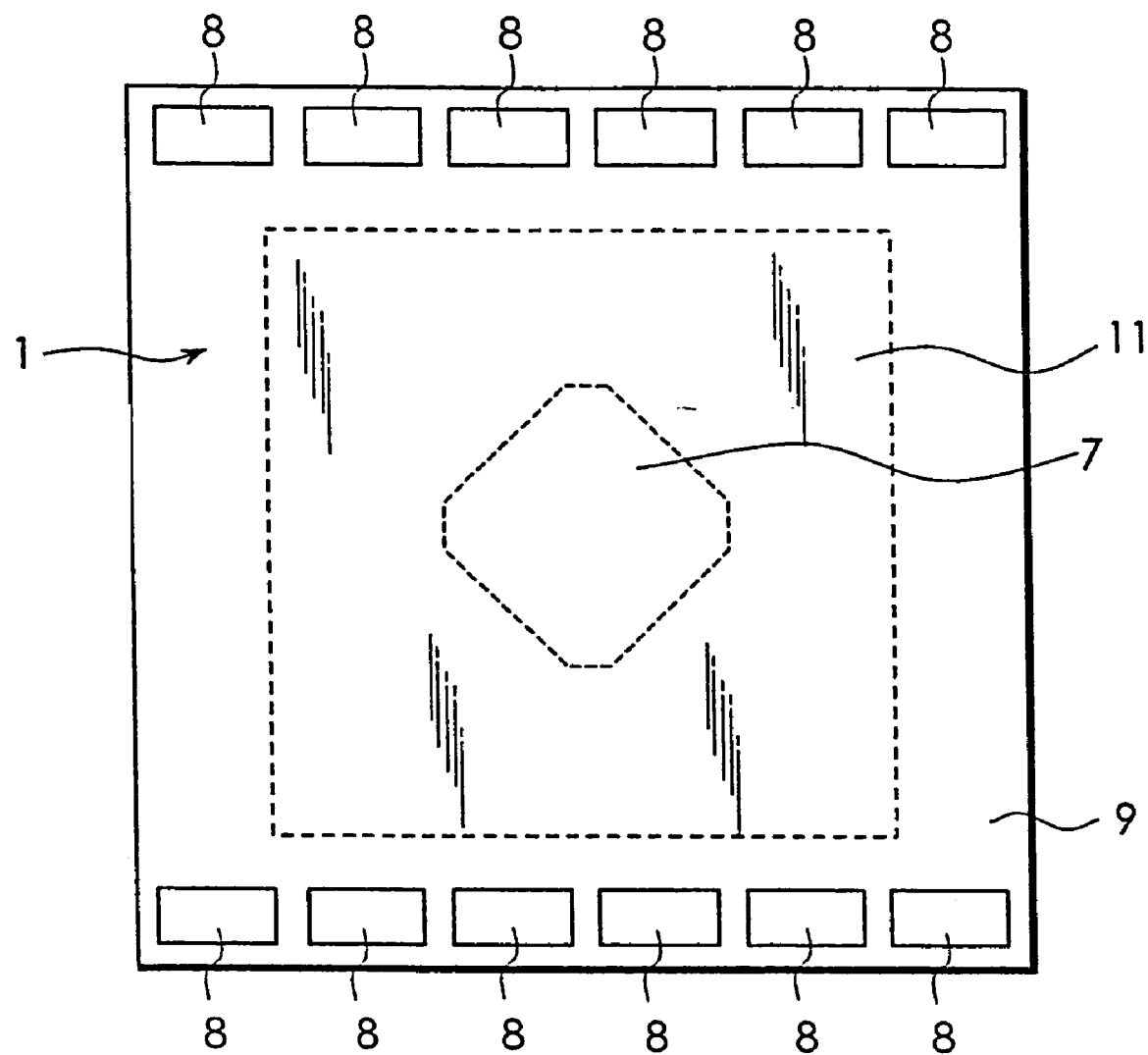
FIG. 3 is a plan view of an acceleration sensor body of the semiconductor acceleration sensor shown in FIG. 1.
Figure 4:
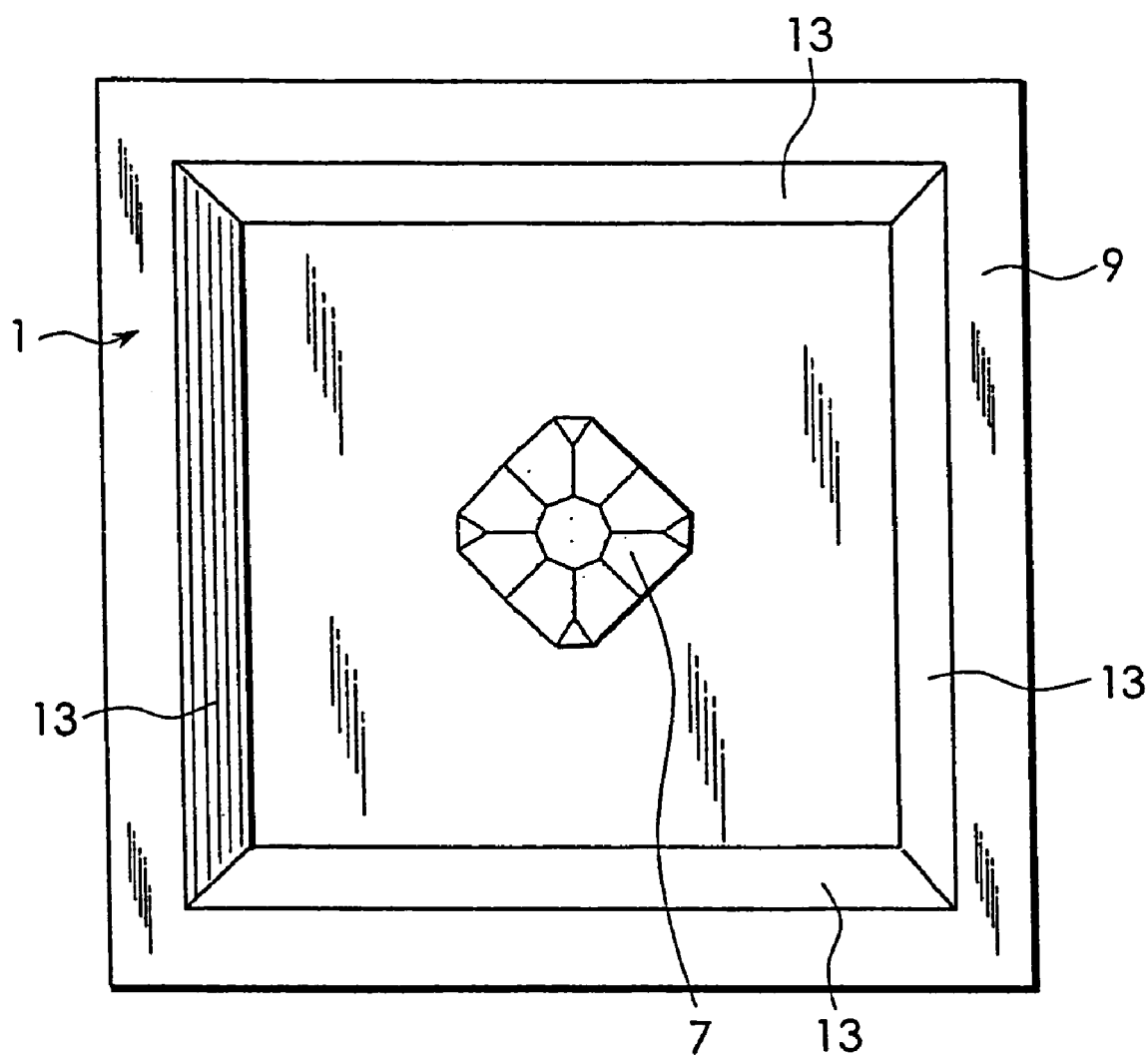
FIG. 4 is a rear view of the acceleration sensor body of the semiconductor acceleration sensor shown in FIG. 1.

FIG. 3 and FIG. 4 are respectively a plan view and a rear view of the acceleration sensor body 1. As shown in FIG. 1 to FIG. 4, the acceleration sensor body 1 comprises a weight fixing portion 7 located at a central area thereof, a cylindrical support portion 9 located at an outer peripheral area thereof, and a diaphragm portion 11 having flexibility and located between the weight fixing portion 7 and the support portion 9. The acceleration sensor body 1 is formed by anisotropic etching on a semiconductor crystal substrate made of monocrystal or single-crystal silicon. On the diaphragm portion 11 formed on a surface of the acceleration sensor body 1, a plurality of sensor elements are formed of diffused resistors for detecting acceleration. On the support portion 9, a plurality of electrodes 8 are formed (see FIG. 3). The semiconductor acceleration sensor of the present embodiment detects acceleration caused by force externally applied and two-axis directional acceleration caused by gravitational acceleration applied with the acceleration sensor being inclined in a stationary state. The magnitude of deformation or distortion of the diaphragm portion 11 corresponds to the acceleration applied, and the resistance of each of the diffused resistors constituting the sensor elements varies with the deformation or distortion of the diaphragm portion 11 caused by the displacement of the weight 3 to which the acceleration has been applied.

The weight fixing portion 7 is so shaped as to protrude from the diaphragm portion 11 toward the weight 3 in an internal space 10 of the support portion 9. At the tip of the weight fixing portion 7, the weight 3 is fixedly mounted in such a manner that the center of the weight is aligned with the centerline C passing through the center of the weight fixing portion 7 and extending in a direction orthogonal to an extending direction of the diaphragm portion 11. The weight fixing portion 7 has a polygonal cross or traverse section. The outer peripheral surface of the weight fixing portion 7 is formed as an inclined surface which is inclined toward the centerline C as it is becoming more distant from the diaphragm portion 11.

The support portion 9 is a rectangular annular wall in shape. An inner peripheral surface of the support portion 9 is constituted by four trapezoidal inclined surfaces 13 of a substantially identical shape which are annularly combined so as to define an outer peripheral surface of a frust-pyramidal internal space of the support portion. The inclined surfaces 13 are inclined toward the centerline C as they become closer to the diaphragm portion 11, thereby partially constituting a stopper structure described later. In this embodiment, an angle θ formed by the inclined surfaces relative to the centerline C is 35.5°. Due to such a construction of the inner peripheral surface of the support portion 9, the internal space 10 of the support portion 9 containing the weight fixing portion 7 is a frust-pyramid in shape of which a cross or traverse section becomes smaller toward the diaphragm portion 11.

The weight 3 is composed of tungsten, having an outline approximately like a disc. The weight is disposed in two internal spaces, the internal space 10 of the support portion 9 and an internal space 12 of the pedestal 5, with one end thereof being fixed onto the weight fixing portion 7 by means of an adhesive. An annular portion 3a of the weight 3 gets into the internal space 10 of the support portion 9. In this embodiment, the annular portion 3a has a first surface 3b extending in a direction along the diaphragm portion 11, a second surface 3c extending in a direction orthogonal to the inner peripheral surface of the support portion 9, an abutting portion 3d constituted by an intersection (or an edge portion) of the first surface 3b and the second surface 3c, and a bottom surface 3e located in an opposite side to the diaphragm portion 11. The abutting portion 3d extends almost circularly so as to have a circular outline as seen from a side where the weight fixing portion 7 is located. Consequently, as shown in FIG. 2, the abutting portion 3d faces almost a central area of each of the four inclined surfaces 13 of the support portion 9. In this embodiment, a contact position of the abutting portion 3d and the inclined surfaces 13 is located on a side of the bottom surface of the support portion 9 relative to a central position in a thickness direction of the support portion 9. The stopper structure is constituted by the abutting portion 3d and the four inclined surfaces 13 of the support portion 9 as described above. Therefore, when the weight 3 is displaced beyond a specified range, the abutting portion 3d abuts against the inclined surfaces 13, thereby restricting a displacement range of the weight 3.

Next, a method of joining the weight 3 to the acceleration sensor body 1 of the semiconductor acceleration sensor will be described below. As shown in FIG. 5(A), firstly an anaerobic adhesive is applied to the weight fixing portion 7 of the acceleration sensor body 1 to which the pedestal 5 is fixed. Then, the weight 3 is held by a vacuum adsorber V and is placed on a surface of the weight fixing portion 7 to which the adhesive has been applied. Next, as shown in FIG. 5(B), adsorption by the vacuum adsorber V is stopped, and the weight 3 is pressed toward the acceleration sensor body 1 using the vacuum adsorber V. With this, the diaphragm portion 11 is deformed, thereby causing the abutting portion 3d of the weight 3 to come in contact with the inclined surfaces 13. Thus, the centerline C of the weight 3 is accordingly aligned with the centerline of the acceleration sensor body. In FIG. 5(B), the diaphragm portion 11 is slightly deformed although it is difficult to confirm it from this figure. Next, the weight 3 is released from the vacuum adsorber V, and consequently the weight 3 goes back away from the support portion 9. In this way, the weight 3 is joined to the acceleration sensor body 1. As with this embodiment, when the stopper structure is constituted by the abutting portion 3d of the weight 3 and the inclined surfaces 13 of the support portion 9, the abutting portion 3d of an almost circular shape, formed on the weight 3, is supposed to abut against almost the central area of each of the four trapezoidal inclined surfaces 13 of the support portion 9 when the weight 3 is displaced significantly in a direction where the diaphragm portion is located. Therefore, it is possible to prevent a displacement large enough to damage the diaphragm portion 11 from being applied to the diaphragm portion 11. Especially, owing to the linear outline shape of the abutting portion 3d, stopper effect will be almost always attained whatever portion of the inner peripheral surface of the support portion 9 the abutting portion 3d comes in contact with. Therefore, even in case of mass production of the sensors, variations in performance can be suppressed.

In addition, merely by moving the weight 3 toward the semiconductor sensor body 1 until the abutting portion 3d of the weight 3 comes in contact with the inclined surfaces 13, self-alignment effect can be obtained whereby the center of the weight 3 is aligned with the centerline C of the weight fixing portion 7.

In this embodiment, the abutting portion 3d is formed by an intersection (or an edge portion) of the first surface 3b and the second surface 3c. The present invention is not limited to this arrangement. The abutting portion may be formed into a protrusion or formed by a curved portion.

INDUSTRIAL APPLICABILITY

According to the present invention, a displacement large enough to damage the diaphragm portion can be prevented from being applied to the diaphragm portion when vertical acceleration is applied to the acceleration sensor, since the abutting portion of the weight abuts against the inner peripheral surface of the support portion. In addition, since the abutting portion has a linear outline shape, stopper effect will be almost always attained whatever portion of the inner peripheral surface of the support portion the abutting portion comes in contact with. As a result, such an advantage is obtained that, even in case of mass production of the sensors, variations in performance can be suppressed. Further, self-alignment effect can be obtained whereby the center of the weight is aligned with the centerline passing through the center of the weight fixing portion as a result of the displacement of the weight along the inclined surfaces, merely by moving the weight toward the semiconductor sensor body until the abutting portion of the weight comes in contact with the inclined surfaces. Therefore, according to the present invention, there is no need of using a special device to align the weight relative to the support portion of the acceleration sensor body.

The invention claimed is:

1. A semiconductor acceleration sensor comprising:
a semiconductor sensor body including a weight fixing portion located at a central area thereof, a cylindrical support portion located at an outer peripheral area thereof, and a diaphragm portion having flexibility and located between said weight fixing portion and said support portion,
an acceleration sensor element composed of diffused resistors formed in said diaphragm portion, and
a weight fixed on said weight fixing portion in such a manner that a center of said weight is aligned with a centerline passing through a center of said weight fixing portion and extending in a direction orthogonal to an extending direction of said diaphragm portion,
said support portion having an inner peripheral surface constituted by four trapezoidal inclined surfaces of a substantially identical shape that are annularly combined so as to define an outer peripheral surface of a frust-pyramidal internal space of said support portion,
wherein said weight has an abutting portion including a linear portion which abuts against said inclined surfaces constituting said inner peripheral surface when said weight makes a maximum displacement in a direction where said diaphragm portion is located,
wherein said abutting portion has a circular outline shape as seen from a side where said weight fixing portion is located, and
wherein a stopper structure is constituted by said inner peripheral surface of said support portion and said abutting portion, for restricting a displacement range of said weight in a direction where said diaphragm portion is located.

2. The semiconductor acceleration sensor of claim 1 further comprising a cylindrical pedestal having an internal space, on which said support portion is mounted, wherein said weight is so shaped as to be disposed in two said internal spaces of said support portion and said pedestal.

3. The semiconductor acceleration sensor of claim 1, wherein a part of said weight disposed in said internal space of said support portion has a first surface extending in a direction along said diaphragm portion and a second surface extending in a direction orthogonal to said inner peripheral surface of said support portion, and an intersection of said first and second surfaces defines said abutting portion.

4. The semiconductor acceleration sensor of claim 1, wherein a contact position of said abutting portion and said inclined surfaces is located on a side of a bottom surface of said support portion relative to a central position of said support portion in a thickness direction thereof.

5. The semiconductor acceleration sensor of claim 1, wherein said weight is made of tungsten.

6. A semiconductor acceleration sensor comprising:
a semiconductor sensor body formed integrally with a semiconductor crystal substrate by means of anisotropic etching, and including a weight fixing portion located at a central area thereof, a cylindrical support portion located at an outer peripheral area thereof, and a diaphragm portion having flexibility and located between said weight fixing portion and said support portion,
an acceleration sensor element composed of diffused resistors formed in said diaphragm portion, and a weight fixed on said weight fixing portion in such a manner that a center of said weight is aligned with a centerline passing through a center of said weight fixing portion and extending in a direction orthogonal to an extending direction of said diaphragm portion, said weight fixing portion protruding into an internal space of said cylindrical support portion, said internal space, in which said weight fixing portion is contained, being shaped in a frust-pyramid of which a cross-sectional shape is becoming smaller toward said diaphragm portion, an inner peripheral surface of said support portion being constituted by four trapezoidal inclined surfaces which define an outer peripheral surface of said internal space, and said weight being so shaped that at least part of said weight is disposed in said internal space, wherein said part of said weight disposed in said internal space has an abutting portion including a liner portion which abuts against said four inclined surfaces constituting said inner peripheral surface when said weight makes a maximum displacement in a direction where said diaphragm portion is located, wherein said abutting portion has a circular outline shape as seen from a side where said weight fixing portion is located, and wherein a stopper structure is constituted by said inner peripheral surface of said support portion and said abutting portion, for restricting a displacement range of said weight in a direction where said diaphragm portion is located.

7. The semiconductor acceleration sensor of claim 6 further comprising a cylindrical pedestal having an internal space, on which said support portion is mounted, wherein said weight is so shaped as to be disposed in two said internal spaces of said support portion and said pedestal.

8. The semiconductor acceleration sensor of claim 6, wherein a part of said weight disposed in said internal space of said support portion has a first surface extending in a direction along said diaphragm portion and a second surface extending in a direction orthogonal to said inner peripheral surface of said support portion, and an intersection of said first and second surfaces defines said abutting portion.

9. The semiconductor acceleration sensor of claim 6, wherein a contact position of said abutting portion and said inclined surfaces is located on a side of a bottom surface of said support portion relative to a central position of said support portion in a thickness direction thereof.

10. The semiconductor acceleration sensor of claim 6, wherein said weight is made of tungsten.

11. A manufacturing method of a semiconductor acceleration sensor, which comprises a semiconductor sensor body including a weight fixing portion located at a central area thereof, a cylindrical support portion located at an outer peripheral area thereof and having an inner peripheral surface constituted by four trapezoidal inclined surfaces of a substantially identical shape which are annularly combined so as to define an outer peripheral surface of a frust-pyramidal internal space of said support portion, and a diaphragm portion having flexibility and located between said weight fixing portion and said support portion; an acceleration sensor element composed of diffused resistors formed in said diaphragm portion; and a weight fixed on said weight fixing portion in such a manner that a center of said weight is aligned with a centerline passing through a center of said weight fixing portion and extending in a direction orthogonal to an extending direction of said diaphragm portion, comprising the steps of:

employing as said weight a weight having a part disposed in said internal space, which has an abutting portion including a linear portion which abuts against said four inclined surfaces constituting said inner peripheral surface when said weight makes a maximum displacement in a direction where said diaphragm portion is located, and has a circular outline shape as seen from a side where said weight fixing portion is located, and joining said weight fixing portion and said weight in a state that said weight is placed close to said semiconductor sensor body until said abutting portion comes in contact with said four inclined surfaces.

12. The manufacturing method of a semiconductor acceleration sensor of claim 11, wherein said weight fixing portion and said weight are joined by using an anaerobic adhesive.

* * * * *

UNITED STATES PATENT AND TRADEMARK OFFICE
CERTIFICATE OF CORRECTION

PATENT NO. : 7,122,396 B2 Page 1 of 1
APPLICATION NO. : 10/530341
DATED : October 17, 2006
INVENTOR(S) : Nakamizo et al.

It is certified that error appears in the above-identified patent and that said Letters Patent is hereby corrected as shown below:

On the Title Page, Item [73], Line 2, delete "Kami-Niikawagu" and insert
--Kami-Niikawagun--.

On the Title Page, Item [56], insert the following
--JP 08-248061 9/1996
JP 05-322919 7/1993
JP 05-256869 10/1993
JP 01-263576 10/1989
JP 3290047 3/2002--.

Signed and Sealed this

Twenty-sixth Day of December, 2006

JON W. DUDAS
*Director of the United States Patent and Trademark Office*